(12) United States Patent
Wyman et al.

(10) Patent No.: US 7,174,699 B1
(45) Date of Patent: Feb. 13, 2007

(54) COMBINATION SEAL BAR AND CUTTER

(75) Inventors: Eric Wyman, Austin, TX (US);
Thomas Pearce, Ruther Glen, VA (US);
Mark Manzi, Chesterfield, VA (US);
Roland Lomerson, Jr., Bradenton, FL (US)

(73) Assignee: Bakery Holdings LLC, Richmond, VA (US)

( * ) Notice: Subject to any disclaimer, the term of this patent is extended or adjusted under 35 U.S.C. 154(b) by 0 days.

(21) Appl. No.: 11/209,379

(22) Filed: Aug. 23, 2005

Related U.S. Application Data

(63) Continuation-in-part of application No. 10/997,298, filed on Nov. 24, 2004.

(51) Int. Cl.
*B65B 51/26* (2006.01)

(52) U.S. Cl. .................. 53/547; 53/374.8; 53/552; 156/515; 493/209

(58) Field of Classification Search .............. 53/374.8, 53/450, 451, 547, 550–553; 156/515, 583.1; 493/207, 209
See application file for complete search history.

(56) References Cited

U.S. PATENT DOCUMENTS

| | | | | |
|---|---|---|---|---|
| 3,574,039 A | * | 4/1971 | Fehr | 156/515 |
| 3,940,305 A | * | 2/1976 | Stenberg | 156/515 |
| 4,317,697 A | * | 3/1982 | McLean | 156/583.1 |
| 4,630,429 A | * | 12/1986 | Christine | 53/479 |
| 4,715,166 A | * | 12/1987 | Kameda | 53/550 |
| 5,056,295 A | * | 10/1991 | Williams | 53/450 |
| 5,067,302 A | * | 11/1991 | Boeckmann | 53/374.8 |
| 5,131,213 A | * | 7/1992 | Shanklin et al. | 53/477 |
| 5,537,804 A | * | 7/1996 | Tolson | 53/479 |
| 6,889,487 B2 | * | 5/2005 | Suga | 53/510 |

* cited by examiner

*Primary Examiner*—Thanh Truong

(57) ABSTRACT

A combination sealing and cutting device comprising: an elongated anvil having an elongated slot therein; an elongated blade having a longitudinal aperture therein; a heating element in the longitudinal aperture; and an actuator mechanism for driving the blade toward and into the elongated slot to accomplish simultaneous sealing and cutting of overlying polymer films. According to various preferred embodiments, the combination sealing and cutting device further includes a pair of parallel flanges extending along both edges of the blade that serve to retain the blade; and film retaining beads along the longitudinal edges of the parallel flanges that serve to retain the plastic films being cut and sealed against the outer edges of the elongated slot.

8 Claims, 8 Drawing Sheets

COMBINATION SEAL BAR AND CUTTER

This application is a continuation-in-part of U.S. patent application Ser. No. 10/997,298 Filed Nov. 24, 2004 and copending herewith.

FIELD OF THE INVENTION

The present invention relates to devices for cutting and sealing polymeric films and more particularly to such a device that simultaneously in a single operation or stroke performs both such operations.

BACKGROUND OF THE INVENTION

In the packaging industry, it is common practice in the continuous packaging of product to transfer the product to a position between two sheets of polymeric or plastic material and to form a package by sealing about the periphery of the contained product once it is within the confines of the overlying and underlying plastic wrapping material.

While it is a relatively simple matter to obtain a seal along the continuous outer edges of the overlying sheets of plastic material, it is a more difficult task to obtain sealing of the individual packages between units thereof, especially in high speed packaging operations since in this processing step, the overlying sheets of plastic material that contain the product must be sealed and cut rapidly and virtually simultaneously to meet the speed demands of such high speed packaging equipment.

A variety of systems have been suggested in the prior art for obtaining such cutting and sealing of the intermediate portions of plastic packaging material over and under wrapped about a unit of product. While no such systems are described specifically herein, suffice it to say that they have been largely either quite bulky because of the division of the cutting and sealing operations into two separate steps or relatively slow when compared to the packaging line speed overall attainable without the rather slow cutting and sealing operation.

Thus, there remains a need in the art for a short cycle, rapid and accurate cutting and sealing device that can meet the demands of high speed packaging equipment.

OBJECT OF THE INVENTION

It is therefore and object of the present invention to provide a high speed, simple to operate yet accurate cutting and sealing system for, for example, plastic packaging operations.

SUMMARY OF THE INVENTION

According to the present invention, there is provided a combination sealing and cutting device comprising: an elongated anvil having an elongated slot therein; an elongated blade having a longitudinal aperture therein; a heating element in the longitudinal aperture; and an actuator mechanism for driving the blade toward and into the elongated slot to accomplish simultaneous sealing and cutting of overlying polymer films. According to various preferred embodiments, the combination sealing and cutting device further includes a pair of parallel flanges extending along both edges of the blade that serve to retain the blade; and film retaining beads along the longitudinal edges of the parallel flanges that serve to retain the plastic films being cut and sealed against the outer edges of the elongated slot.

DETAILED DESCRIPTION

Figure 1:
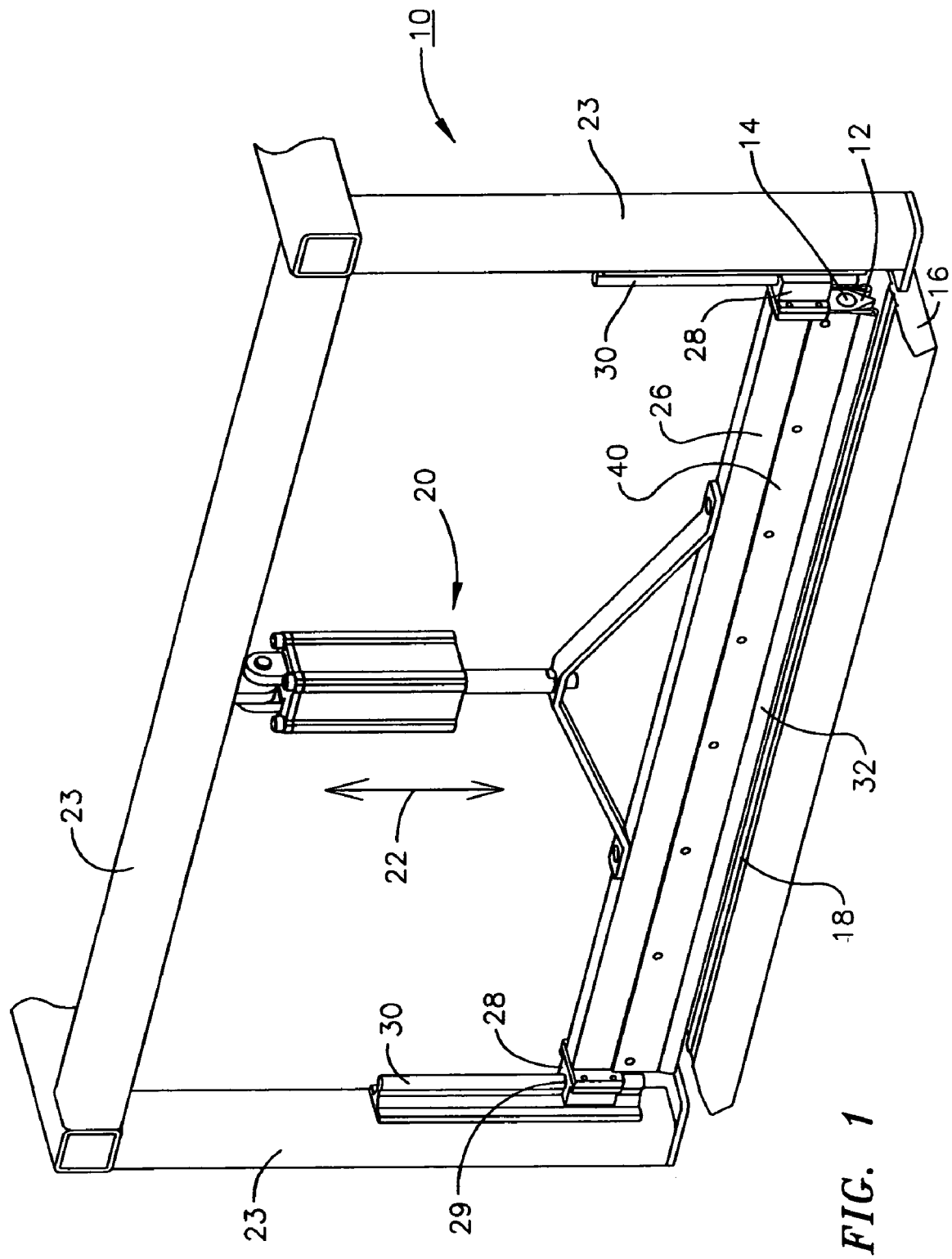
FIG. 1 is a perspective view of the combination sealing and cutting bar of the present invention.

Referring now to the accompanying Figures, the combination sealing and cutting bar of the present invention 10 comprises; an elongated cutting and sealing blade 12 having a longitudinal aperture 14 running the length of the interior thereof; a anvil 16 having a longitudinal or elongated slot 18 running the length thereof; an actuator 20 that initiates movement upwards and downwards or reciprocal movement as indicated by double headed arrow 22; and a frame 23 that provides support for the entire mechanism. Located within aperture 14 is a heating element 24 best seen in FIGS. 2–5 that show a side view of the sealing and cutting device of the present invention. Heating element 14 that may be of any suitable material and configuration well known in the art including various resistance type heaters etc. provides the heat necessary to accomplish cutting and sealing of polymeric films, as described below, to blade 12. Actuator 20 may comprise any of a well known number of actuating mechanisms such as pneumatic, hydraulic and servo based actuators. Support 26, although not essential to the operation of the device of the present invention is provided as an attachment between actuator 20 and blade 20. Additionally, support 26, at its extremities provides mounting points for brackets 28 that contact guide rails 30 as described below.

As best seen in FIGS. 2–5 anvil 16 encompasses a longitudinal slot 18. While in the accompanying drawings slot 18 is shown as being rectangular in shape it could, of course, be of any suitable shape that does not affect the operation of device 10 as described below. As also shown in FIGS. 2–5 are auxiliary elements of device 10 that significantly enhance its functioning in the particular application shown. These include brackets 28 that include a recess 29 that rides on guide rails 30 to provide stability and positional accuracy and retaining beads 32 fabricated from a resilient and temperature resistant material such as a silicone polymer that serve to restrain movement of any kind between a pair of films 34 and 36 that are being cut and sealed to each other. Retaining beads 32 are coated or applied along the entire length of flanges 38 and 40 on the edges thereof that are remote from the point of attachment to blade 12. Flanges 38 and 40 serve the multiple purposes of securing blade 12 and providing attachment points for retaining beads 32.

Figure 2:
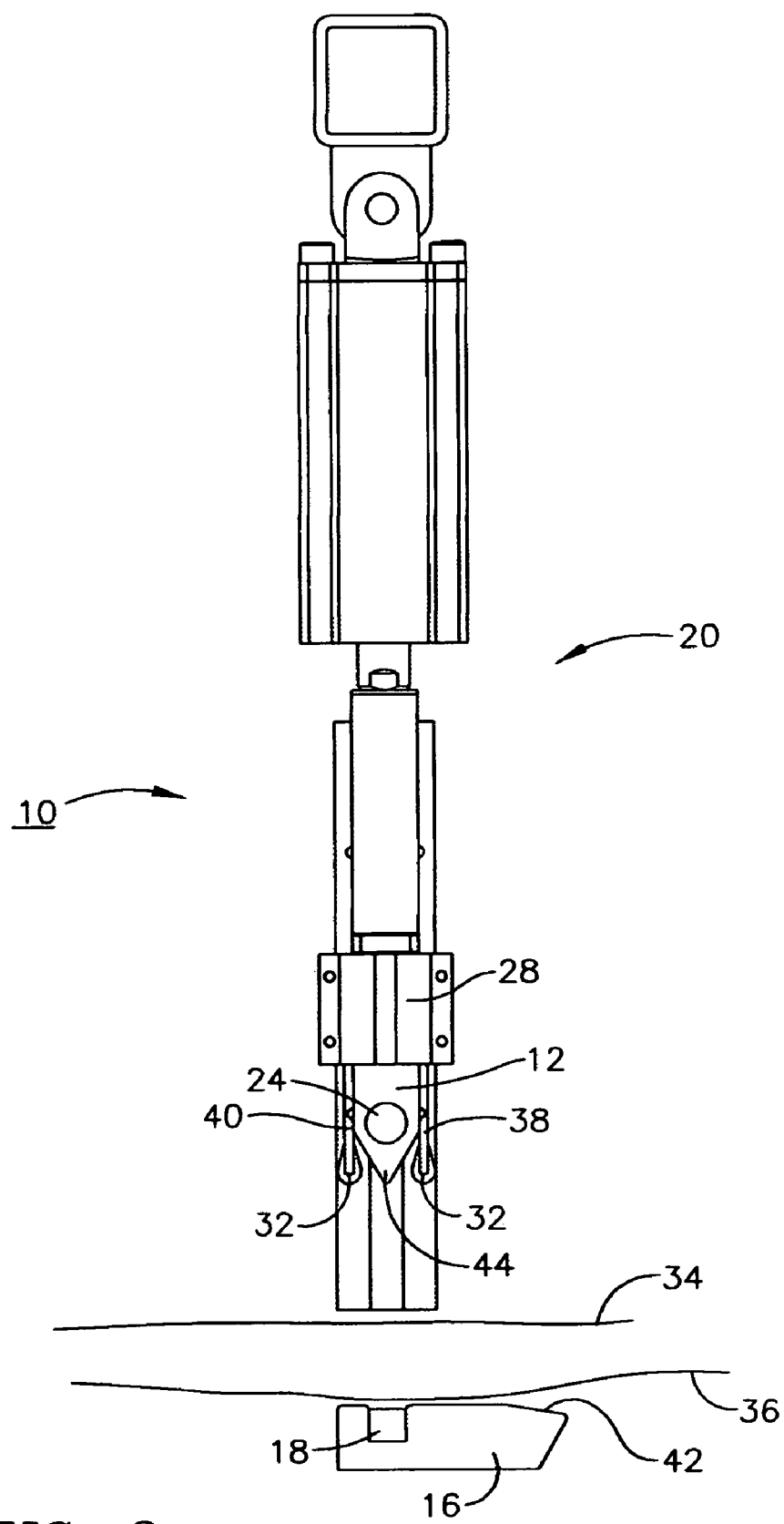
FIG. 2 is a side view of the combination sealing and cutting bar of the present invention in its raised position.
Figure 3:
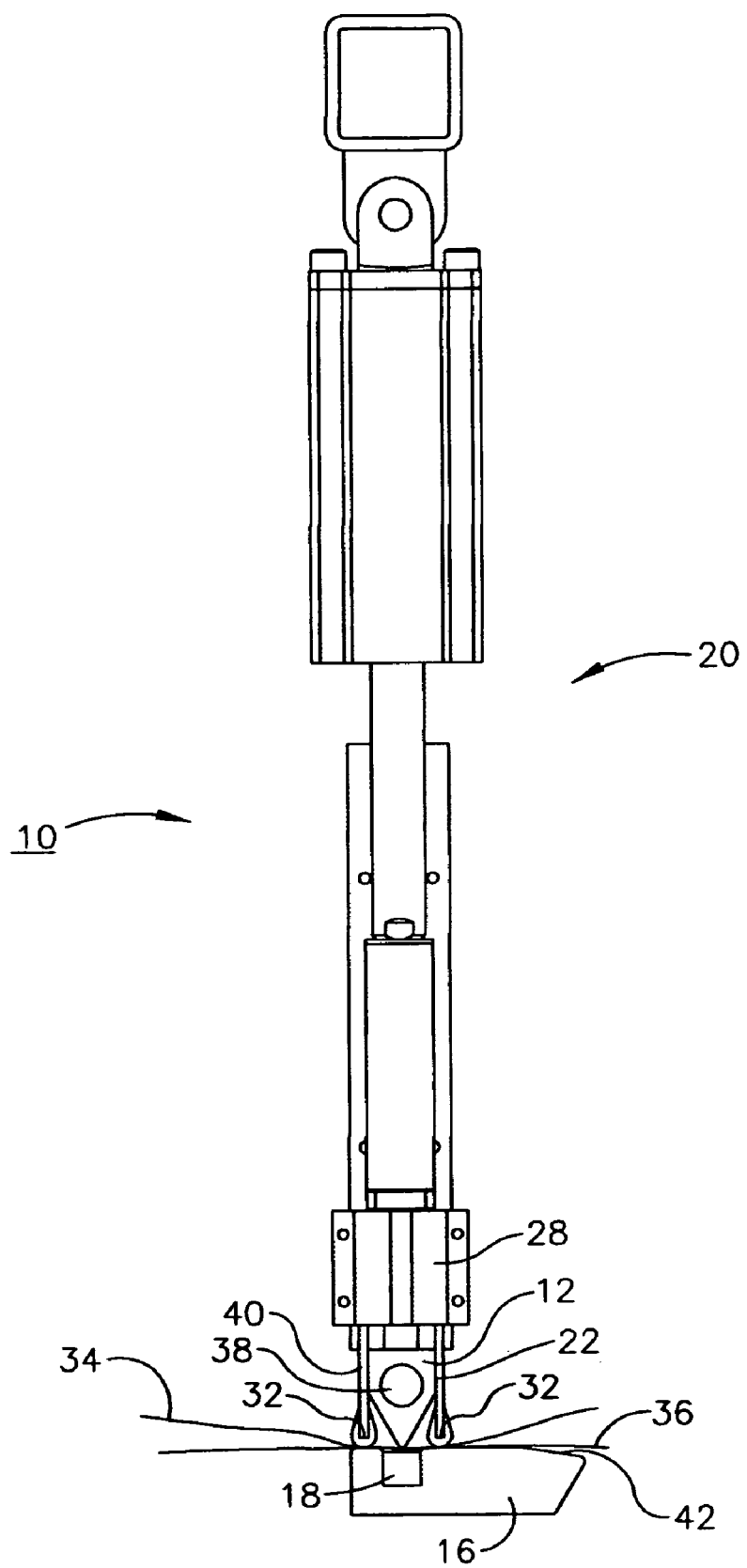
FIG. 3 is a side view of the combination sealing and cutting bar of the present invention as it approaches its cutting/sealing position.

Operation of sealing and cutting device 10 is best understood by a sequential study of FIGS. 2–5 that show, in order, the various steps in the operation of device 10. FIG. 2 shows device 10 in the raised or non-contacting position above slot 18 with polymer sheets 34 and 36 to be cut and sealed therebelow before initiation of the cutting and sealing operation. Referring now to FIG. 3, in this position retaining beads 32 have just contacted films 34 and 36 and have brought them into taut contact with upper surface 42 of anvil 16 along either side of slot 18. In this condition, movement of polymer films 34 and 36 relative to each other, longitudinally or laterally is inhibited. It should be noted that the lower extremities of retaining beads 32 are approximately parallel to the tip 44 of blade 12 in the retracted position depicted in FIG. 2.

Figure 4:
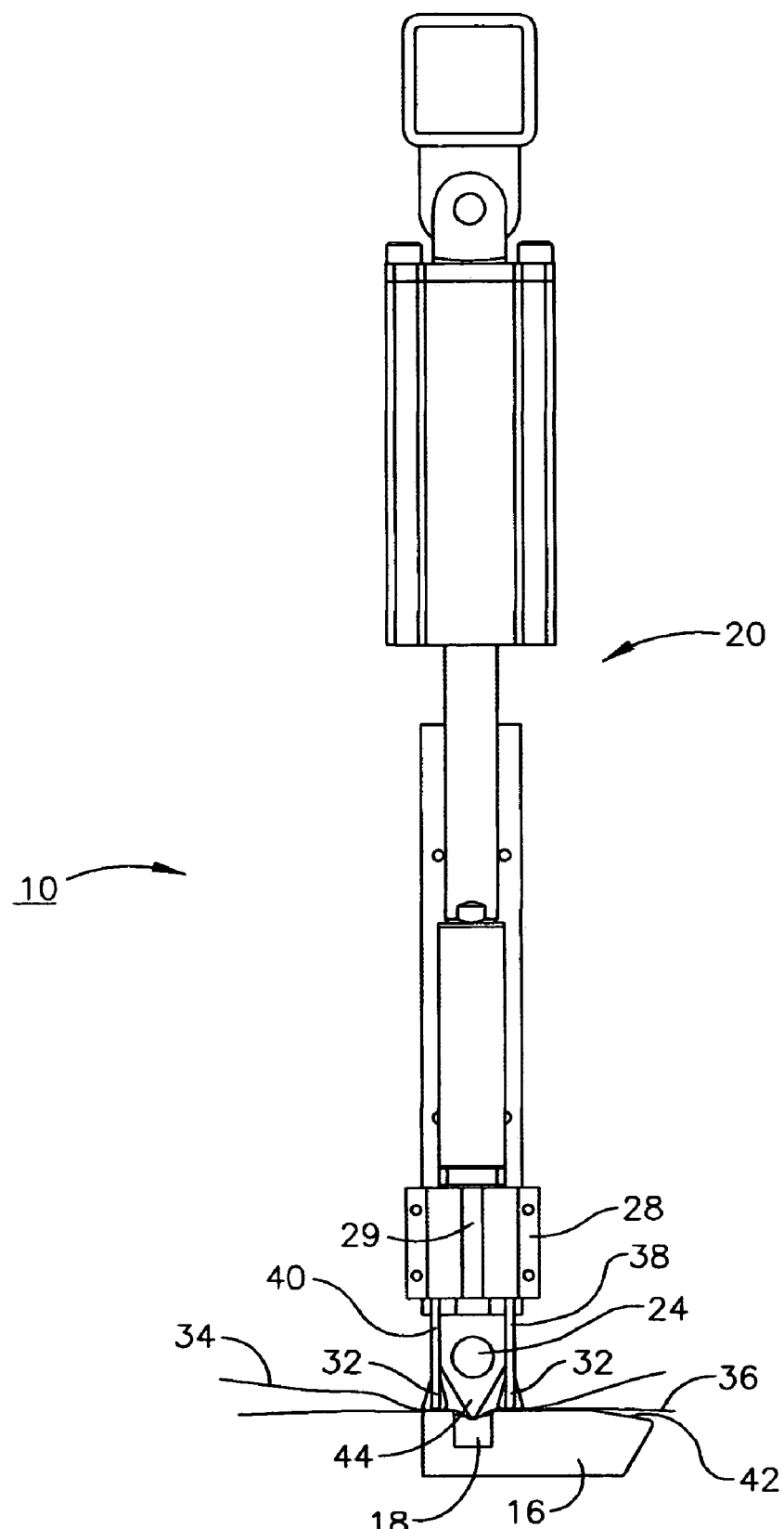
FIG. 4 is a side view of the combination sealing and cutting bar of the present invention in its cutting/sealing position.
Figure 5:
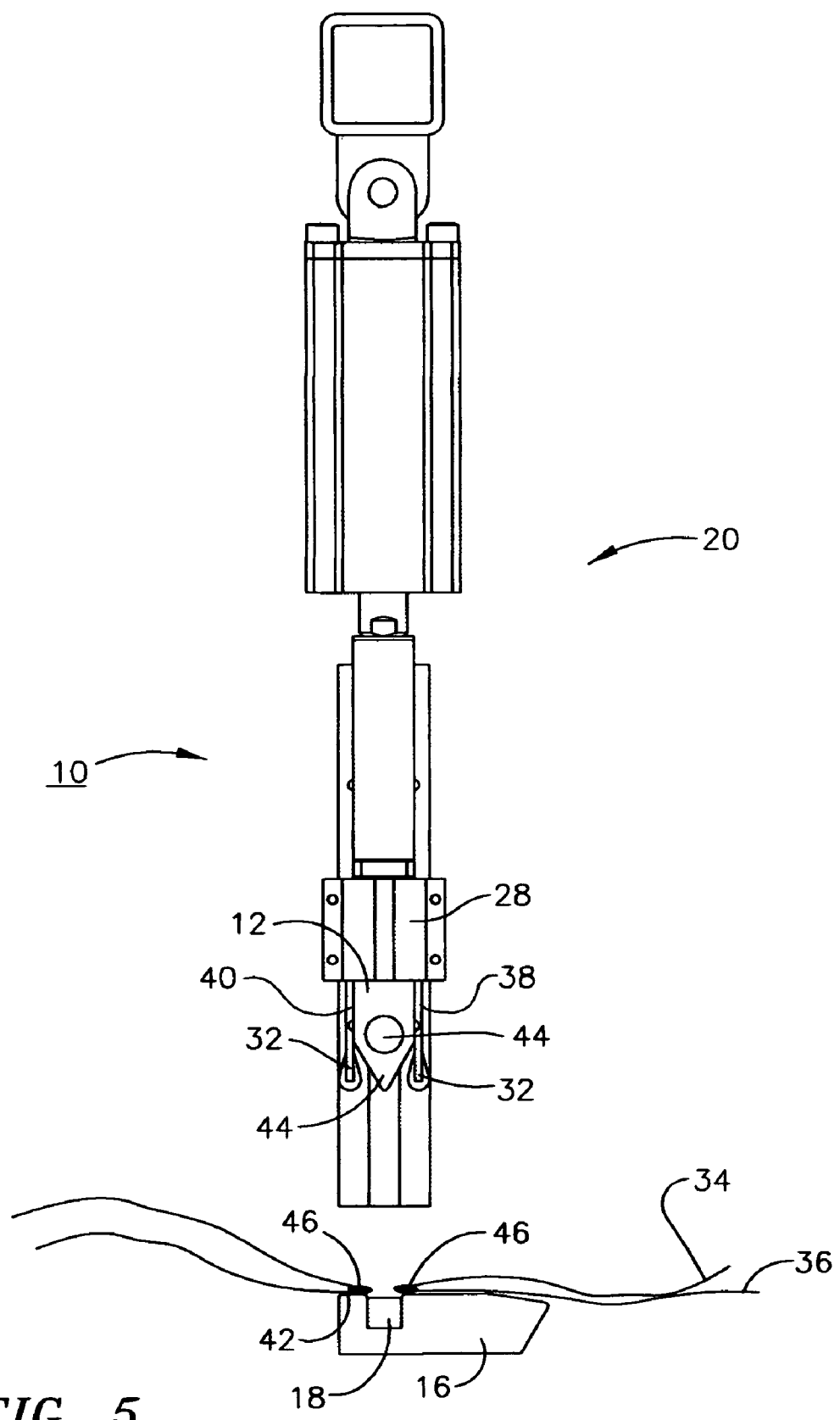
FIG. 5 is a side view of the combination sealing and cutting bar of the present invention in its retracted post cutting/sealing position.

FIG. 4 shows device 10 in the sealing and cutting position wherein depression of retaining beads 32 allows the tip 44 of elongated blade 12 to extend slightly below the bottom beads of retaining beads 32 in their compressed condition to penetrate very slightly into slot 18. Heat from heating element 24 that has heated elongated blade 12 to a suitable temperature initiates cutting of polymer sheets 34 and 36 as well as fusion thereof. As will be apparent to the skilled artisan, while it is shown in the accompanying Figures and is preferred in the operation of the device as described herein that retaining beads 32 compress upon contact with anvil surface 42, some depression of anvil surface 42 or any combination of the depression of retaining beads 32 and anvil surface 42 could also provide the conditions necessary to obtain sealing and cutting as described herein. As best seen in FIG. 5 that depicts the post sealing/cutting position for device 10, i.e. the retracted position thereof, polymer material from polymer sheets 34 and 36 that has been fused during the cutting/sealing operation shown in FIG. 4 forms elongated beads of polymer 46 that serve to seal the opposing and now separated edges of polymer sheets 34 and 36 thereby having accomplished both the cutting and sealing of polymer sheets 34 and 36 in a single very fast operation.

Thus, in a single stroke of device 10 both cutting and sealing of the edges of polymer sheets 36 and 38 has been accomplished. Such an operation can be performed extremely quickly thereby allowing for high speed operation of device 10.

Figure 6:
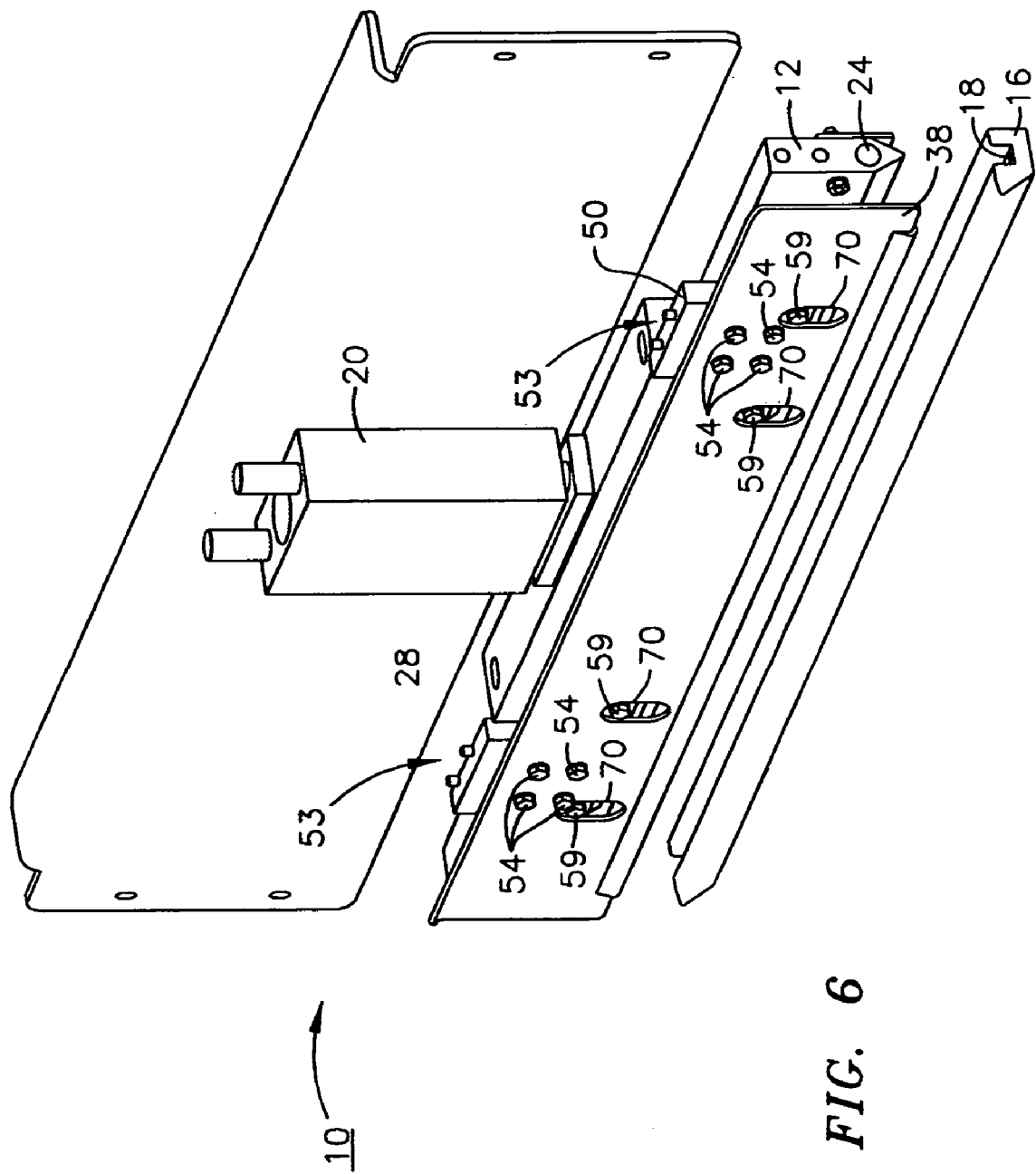
FIG. 6 is an isometric view of an alternate preferred embodiment of the cutter bar of the present invention.
Figure 7:
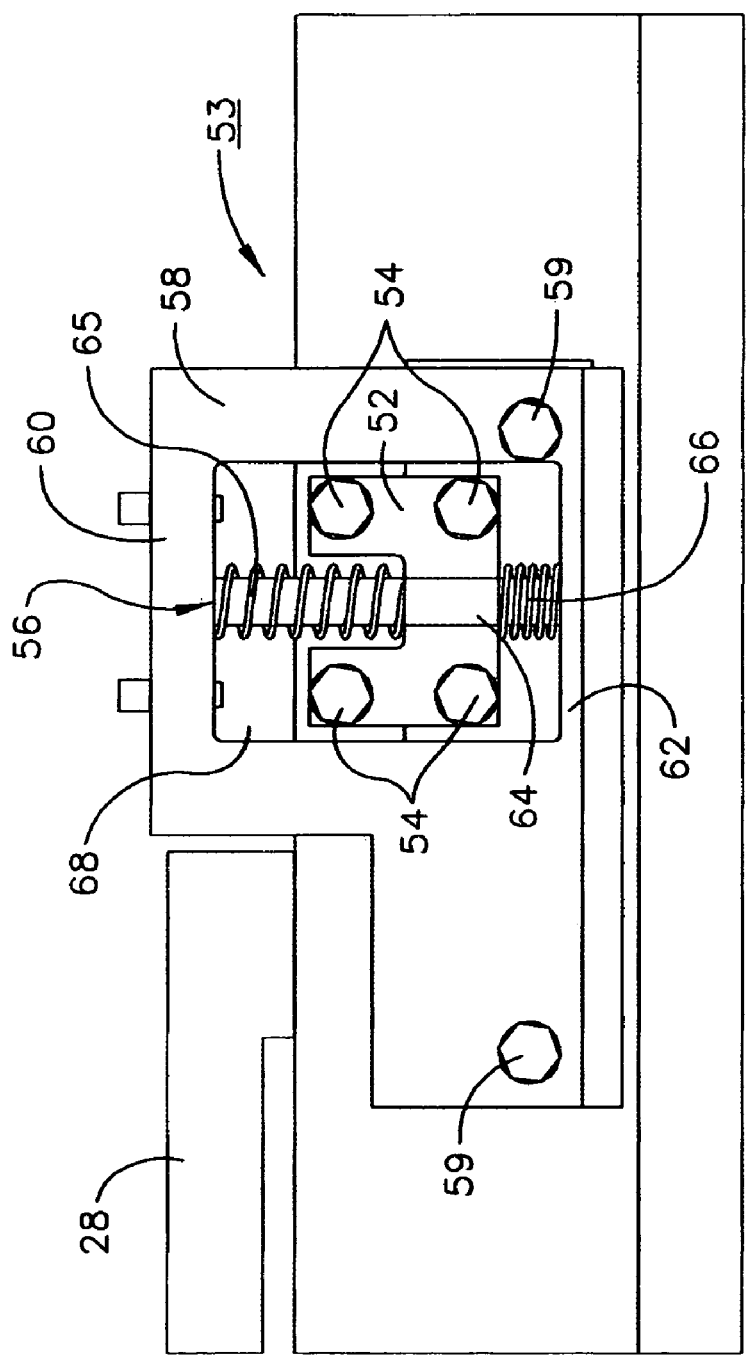
FIG. 7 is a detail side view of one element of the cutter bar of FIG. 6.
Figure 8:
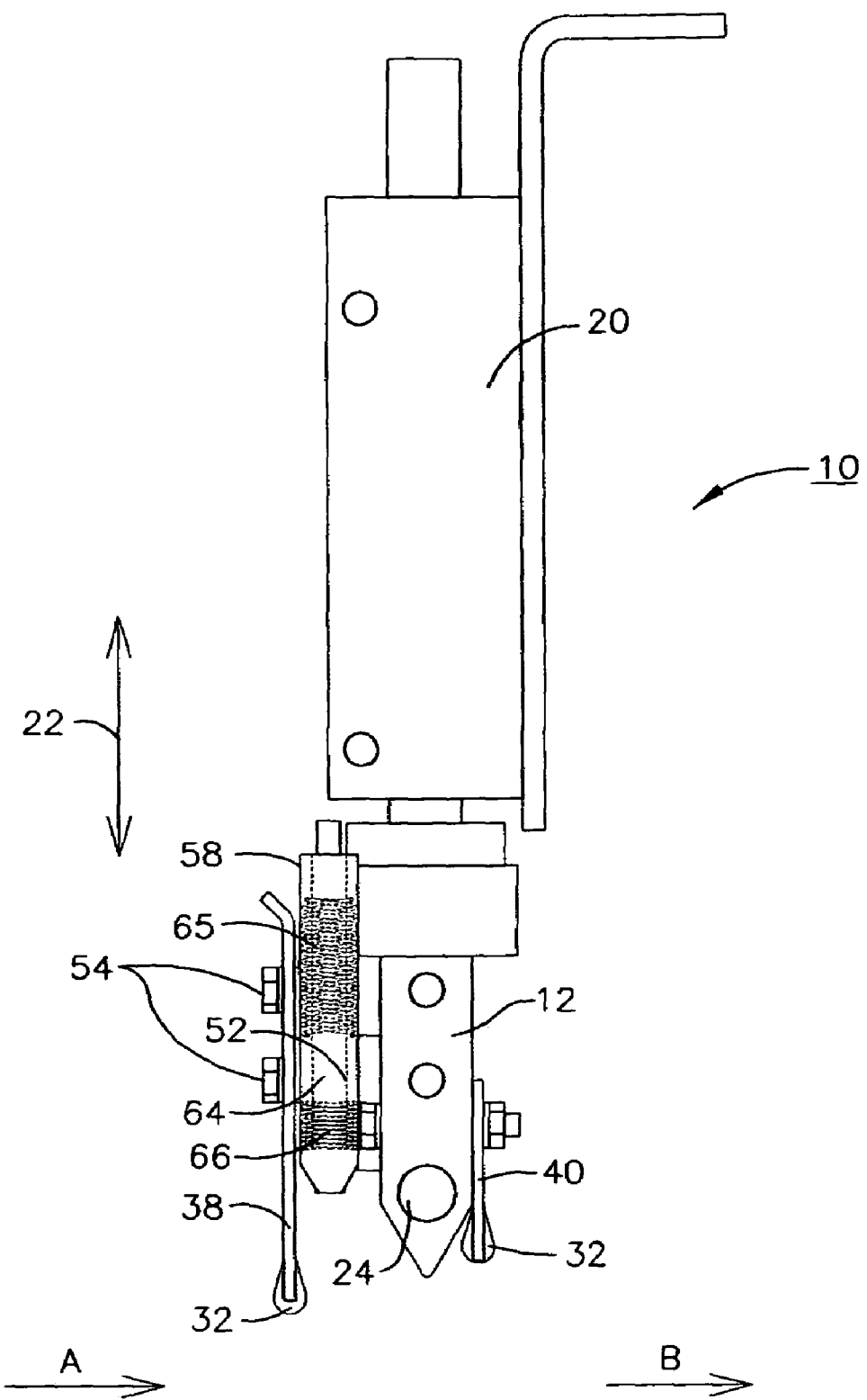
FIG. 8 is an end view of a portion of the cutter bar of FIGS. 6 and 7.

Depicted in FIGS. 6–8 is an alternative preferred embodiment of the device 10 of the present invention. As depicted in these Figures, flange 38 is attached to sealing blade 12 by a pair of attachment assemblies 53 described below. Flange 38 is attached to a slide 52 by bolts 54. A shaft 56 that is mounted to a bracket 58 at the top 60 and bottom 62 of bracket 58 passes loosely and unimpeded through an aperture 68 in slide 52. Springs 65 and 66 are mounted about shaft 56. Bracket 58 is in turn attached to blade 12 with bolts 59 such that flange 38 can move up and down in the direction indicated by arrow 22 as slide 52 moves similarly in aperture 68 in bracket 58. Spring 65 serves to drive slide 52 downward while spring 66 provides cushioned resistance to such movement. Thus, as the seal assembly comprising sealing blade 12 and flange 38 moves downward, spring 65 remains extended until flange 38 strikes anvil 16. As this assembly continues downward pressure is applied to tip 32 through flange 38 thereby retaining pressure on film 34 at its inward side while allowing the assembly to continue its downward movement. During the up stroke of the assembly spring loaded flange and associated retaining bead 32 stays down after sealing blade 12 has disengaged from anvil 16 and the material in slot 18 thereby maintaining pressure on the now severed inward bound portion of film 34. This delayed removal of flange 38 and associated retaining bead 32 from contact with the inward bound portion of film 34, i.e. that moving from the direction of arrow A shown in FIG. 8, allows the outward bound portion of film 34, i.e. that moving in the direction of arrow B in FIG. 8 or away from anvil 16 with a package being formed downstream, without pulling additional inward bound film with it in cases where cutting is not entirely complete. Absent such delayed action between removal outward bound film 34 and release of pressure on inward bound film 34 inward bound film 34 might in some instances of incomplete cutting remain attached to outward bound film 34 thereby affecting both the integrity of a package being formed downstream and causing film waste. As seen in FIG. 6, slots 70 are provided for access to bolts 59.

Because of the operational efficiency just described, it is highly desirable that only one flange 38, that flange addressing the inward bound side of the apparatus 10 be fabricated as just described. It would of course be possible to equip both the inward and outward bound sides of apparatus 10, i.e. both flanges 38 and 40 with the spring loadings just described in connection with the inward bound side, if one desired to do so. Of course, in order to achieve the operational advantage just described, the inward bound flange would still have to release after the outward bound flange released film 34.

While blade 12 and anvil 16 can be fabricated from a wide variety of materials, the use of a high heat conductivity material such as aluminum or copper and alloys thereof has been found most desirable for fabrication of blade 12, while the use of a heat resistant foam such as one fabricated from a silicone polymer has been found most effective for anvil 16. Operating temperatures for blade 12 will, of course, vary with the material being sealed as well as the speed of operation, but are readily determinable by those skilled the polymer fusing/sealing arts.

There has thus been described a very simple yet highly effective high speed cutting and sealing device for cutting and sealing a pair of overlying polymer sheets.

As the invention has been described, it will be apparent to those skilled in the art that the same may be varied in many ways without departing from the spirit and scope of the invention. Any and all such modifications are intended to be included within the scope of the appended claims.

What is claimed is:

1. A combination sealing and cutting device for sealing and cutting a pair of overlying polymer films inserted therein comprising:

A) an elongated anvil having an elongated slot therein;
   B) an elongated blade parallel to said elongated anvil having a tip and a longitudinal aperture therein;
   C) a heating element in said longitudinal aperture; and
   an actuator mechanism attached to said elongated blade for driving said blade toward and said tip into said longitudinal slot to accomplish simultaneous cutting and sealing of a pair of overlying polymer films inserted between said elongated anvil and said elongated blade, wherein said elongated blade has opposing lateral longitudinal edges and further including a pair of opposing longitudinal flanges extending from said opposing lateral longitudinal edges in the direction of said tip and having extremities remote from said opposing longitudinal edges, said tip terminating just below the extremities of said pair of opposing longitudinal flanges and at least one of said opposing longitudinal flanges is attached to one of said opposing lateral edges through at least a pair of attachment assemblies each comprising:

i) a bracket having a top portion and a bottom portion attached to the cutting and sealing blade, said bracket including an open aperture therein;
ii) a shaft fixedly extending from said top to said bottom portion through said open aperture;
iii) a slide attached to one of said opposing longitudinal flanges within said aperture and including a vertical aperture therethrough having first and second ends allowing free movement of said slide along said shaft within said open aperture;
iv) a first spring having opposing extremities, about said shaft and, one of said extremities engaging said top portion and the second engaging said first end of said vertical aperture; and
v) a second spring having opposing extremities, about said shaft, one of said extremities engaging said bottom portion and the other of said extremities engaging said second end of said vertical aperture.

2. The combination sealing and cutting device of claim 1 wherein said bracket is attached to said cutting and sealing blade by bolts and apertures are provided in said flange for access to said bolts.

3. The device of claim 1 further including retaining beads of a heat resistant and resilient material applied to said longitudinal extremities of said pair of opposing longitudinal flanges and wherein when said retaining beads of a heat resistant and resilient material are compressed against said anvil on either side of said slot when said tip penetrates into said slot.

4. The device of claim 1 further including a longitudinal blade support connected to said blade and said actuator and a frame supporting the various elements of said device.

5. The device of claim 1 wherein said elongated blade is fabricated from a material selected from the group consisting of copper and aluminum and alloys thereof.

6. The device of claim 1 wherein said anvil comprises a heat resistant polymeric foam.

7. The device of claim 6 wherein said retaining beads of a heat resistant and resilient material are fabricated from a silicone polymeric material.

8. The device of claim 7 wherein said longitudinal blade support has opposing extremities and further including;
  A) as part of said frame, a pair of opposing upright supporting members at said opposing extremities;
  B) guide rails located on each of opposing upright supporting members; and
  C) brackets mounted on each of the opposed extremities of the longitudinal support and including recesses that engage said guide rails so as to guide reciprocal movement of said blade.

* * * * *